Patented Dec. 3, 1940

2,223,924

UNITED STATES PATENT OFFICE 2,223,924

PREPARATION FOR USE IN CARBON COATING TELEVISION TUBES

Karl Stephan, Lichterfelde, near Berlin, Germany, assignor to the firm J. D. Riedel-E. de Haen Akt.-Ges., Berlin-Britz, Germany No Drawing. Application November 16, 1937, Serial No. 174,911. In Germany November 19, 1936

4 Claims. (Cl. 250—141)

It is already known to provide interior parts of Braun's tubes (oscillograph tubes), for example the clean or metallized glass surfaces, with black coatings by deposition of carbon black. In the blackening with carbon black, however, in addition to carbon unburnt constituents of the flame also separate, more particularly higher hydrocarbons, which have an extraordinarily disadvantageous effect during the subsequent evacuation of the tubes, since owing to the necessity of their complete removal the complete degassing of the tubes is very much retarded; moreover during the high heating of the tubes substances are always formed again which during the pumping deposit for example on the fluorescent screen of the television tubes, and there exert an injurious action.

In order to avoid this drawback colloidal carbon solutions have been used in place of carbon black. Even in this case, however, gas evolution is not avoided during the high heating, for which reason the use of a highly diluted solution is recommended, which, however, again yields only a relatively thin coating with correspondingly diminished cover power, and further the capability of the layer of adhering to glass after heating to 500°, that is to say after thermal decomposition of the protective colloids, leaves much to be desired.

It has now been found that these disadvantages can be avoided if, instead of applying carbon black to the parts to be blackened, colloidal carbon solutions are applied which contain no organic protective colloids, or only small quantities thereof, and are admixed with an inorganic binding agent. At the most such small quantities come into question as are necessary for the production of the colloidal solution. On highly heating and evacuating tubes treated in this way no products whatever deposit on the fluorescent screen, and in addition the pumping time required for the degassing is substantially shortened as compared with the known method. Finally, the coatings obtainable by the new method are of outstandingly good covering power and adhering power. As binding agents come into question for example sodium water glass or potassium water glass, boric acid and borates, aluminium phosphate, enamels and the like, insofar as the softening point thereof lies below 500°.

The solutions in a condition ready for use are prepared for example by mixing 100 parts of a watery 20% graphite sol with the substances, e. g. 5–10 parts of potassium water glass, dissolved or suspended in water, and these solutions are then applied to the surfaces to be blackened, for example by brushing-on, pouring on, or spraying. After drying, which may be effected for example by blowing a stream of warm air through the tubes a layer remains behind which on evacuating and highly heating the tubes adheres firmly to the metal or glass surface covered by it.

I claim:

1. A preparation for use in carbon coating television tubes having an electron gun therein and a fluorescent screen with a carbon coating on the wall of said tubes between said gun and said screen consisting of a colloidal solution of carbon with at most such small quantities of organic protective colloids as are necessary for the production of the colloidal solution and an inorganic binding agent.

2. A preparation as claimed in claim 1 wherein the inorganic binding agent has a softening point below 500° C.

3. A preparation for use in carbon coating television tubes having an electron gun therein and a fluorescent screen with a carbon coating on the wall of said tubes between said gun and said screen consisting of a colloidal solution of carbon with at most such small quantities of organic protective colloids as are necessary for the production of the colloidal solution, and at least one substance selected from a group consisting of sodium water glass, potassium water glass, aluminium phosphate, boric acid and salts of boric acid.

4. A preparation for use in carbon coating television tubes having an electron gun therein and a fluorescent screen with a carbon coating on the wall of said tubes between said gun and said screen consisting of 100 parts of an aqueous 20% graphite sol with at most such small quantities of organic protective colloids as are necessary for the production of the colloidal solution, and 5 to 10 parts of a substance selected from the group consisting of sodium water glass, potassium water glass, aluminium phosphate, boric acid and salts of boric acid.

KARL STEPHAN.